US 6,574,522 B1

(12) United States Patent
Douglas (10) Patent No.: US 6,574,522 B1
(45) Date of Patent: Jun. 3, 2003

(54) SYSTEM AND METHOD OF COLLECTING STATISTICALLY ANALYZING AND GRAPHICALLY DISPLAYING QUALITY CONTROL DATA FOR A MANUFACTURING PROCESS

(75) Inventor: Leonard Richard Douglas, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/473,041

(22) Filed: Dec. 28, 1999

Related U.S. Application Data
(60) Provisional application No. 60/155,933, filed on Sep. 24, 1999.

(51) Int. Cl.[7] .......................... G06F 19/00; G05B 19/18
(52) U.S. Cl. ........................................ 700/109; 700/65
(58) Field of Search .................................. 700/108, 109, 700/110, 51, 83, 65; 709/200–203, 310

(56) References Cited

U.S. PATENT DOCUMENTS

| | | | | |
|---|---|---|---|---|
| 5,355,320 A | | 10/1994 | Erjavic et al. .................. 716/4 |
| 5,659,467 A | | 8/1997 | Vickers .......................... 700/9 |
| 5,691,895 A | | 11/1997 | Kurtzberg et al. ............. 700/29 |
| 5,706,213 A | | 1/1998 | Takakura et al. .............. 702/84 |
| 5,847,957 A | * | 12/1998 | Cohen et al. ................. 700/108 |
| 5,862,054 A | | 1/1999 | Li .................................. 700/121 |
| 6,128,403 A | * | 10/2000 | Ozaki ........................... 382/145 |
| 6,139,177 A | * | 10/2000 | Venkatraman et al. ......... 700/83 |
| 6,157,943 A | * | 12/2000 | Meyer .......................... 709/203 |
| 6,192,281 B1 | * | 2/2001 | Brown et al. .................. 700/2 |
| 6,200,025 B1 | * | 3/2001 | Rich ............................. 378/207 |
| 6,201,996 B1 | * | 3/2001 | Crater et al. ................... 700/9 |
| 6,259,956 B1 | * | 7/2001 | Myers et al. .................. 700/80 |
| 6,282,454 B1 | * | 8/2001 | Papadopoulos et al. ....... 700/83 |
| 6,303,395 B1 | * | 10/2001 | Nulman ....................... 438/14 |
| 6,332,110 B1 | * | 12/2001 | Wolfe ........................... 702/22 |
| 6,334,107 B1 | * | 12/2001 | Gale et al. .................... 705/10 |
| 6,374,296 B1 | * | 4/2002 | Lim et al. ..................... 709/225 |

* cited by examiner

*Primary Examiner*—Maria N. Von Buhr (57) ABSTRACT

A system and method for handling quality control data for a manufacturing process among a main computer and a plurality of remote computers, including the steps of establishing a connection between at least one of the remote computers and the main computer via a web browser, inputting quality control data of the manufacturing process from the remote computer into a database of the main computer via the web browser, performing a statistical analysis on the quality control data input into the main computer, and posting results of the statistical analysis on a web site of the main computer accessible to the remote computers through the web browser.

19 Claims, 7 Drawing Sheets

SYSTEM AND METHOD OF COLLECTING STATISTICALLY ANALYZING AND GRAPHICALLY DISPLAYING QUALITY CONTROL DATA FOR A MANUFACTURING PROCESS

CROSS-REFERENCE TO RELATED APPLICATIONS

This application is related to a provisional application having Ser. No. 60/155,933 filed Sep. 24, 1999.

BACKGROUND OF THE INVENTION

The present invention relates to a system and method of collecting, statistically analyzing, and graphically displaying process quality control data for a manufacturing process within a network and, more particularly, the ability to accomplish such functions between a single main computer a plurality of remote computers accessible thereto via a web browser.

It is well known within the manufacturing environment for various parameters of a product or process to be quantified and compared with respect to a desired range so as to maintain quality standards. By utilizing such data in this manner, it can be determined whether certain factors in the process should be adjusted. Oftentimes, it is preferred that the monitoring system perform the statistical process control in real time, as disclosed in U.S. Pat. No. 5,862,054 to Li and U.S. Pat. No. 5,691,895 to Kurtzberg et al. It will be seen, however, that computers used for this purpose have been interconnected in a typical network configuration. This not only requires direct connection between the various computers, but also that each computer have the software loaded thereon which enables quality control data to be input and analyzed by a known statistical process control method.

It will be understood that there are several ways of statistically analyzing quality control data within the manufacturing environment, as indicated within U.S. Pat. No. 5,659,467 to Vickers and U.S. Pat. No. 5,355,320 to Erjavic et al. Additionally, some of these patents disclose different ways of displaying the information obtained through such statistical analysis. None of the disclosed prior art references, however, focuses on an improved manner of handling the transfer of quality control data between a plurality of computers which are remotely located or the minimization of resources required to perform such functions.

Accordingly, it would be desirable for a system and method to be developed in which a single site or main computer is able to easily have quality control data for a manufacturing process input therein from a plurality of remote computers, whereupon the main computer is able to apply a statistical process control method thereto and make the results of such analysis accessible to the remote computers. In this way, parameters of the manufacturing process can be modified as dictated by the analysis of quality control data provided by all locations in a more efficient and less expensive manner. Moreover, none of the remote computers is required to include the software performing the statistical analysis thereon, which is particularly relevant when developing a prototype process.

BRIEF SUMMARY OF THE INVENTION

In accordance with one aspect of the present invention, a system for handling quality control data for a manufacturing process between a plurality of computers is disclosed. The system includes a main computer for analyzing quality control data of a designated area of the manufacturing process by means of a statistical process control method, with the main computer further including memory for storing a database of quality control data and a processor for applying the statistical process control method to the quality control data and posting the results of the statistical analysis on a web site of the main computer. The system also includes at least one computer remotely located from the main computer, with each remote computer further including communications circuitry for establishing a connection with the main computer web site by means of a web browser and an interface for inputting quality control data for a designated area of the manufacturing process into the web browser for receipt by the main computer and receiving results of a statistical analysis of the quality control data from the main computer web site through the web browser.

In accordance with a second aspect of the present invention, a method of handling quality control data for a manufacturing process among a plurality of computer sites is disclosed. The method includes the steps of establishing a connection between at least one remote computer and a main computer via a web browser, inputting quality control data of the manufacturing process from the remote computer into a database of the main computer via the web browser, performing a statistical analysis on the quality control data input into the main computer, and posting results of the statistical analysis on a web site of the main computer accessible through the web browser.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
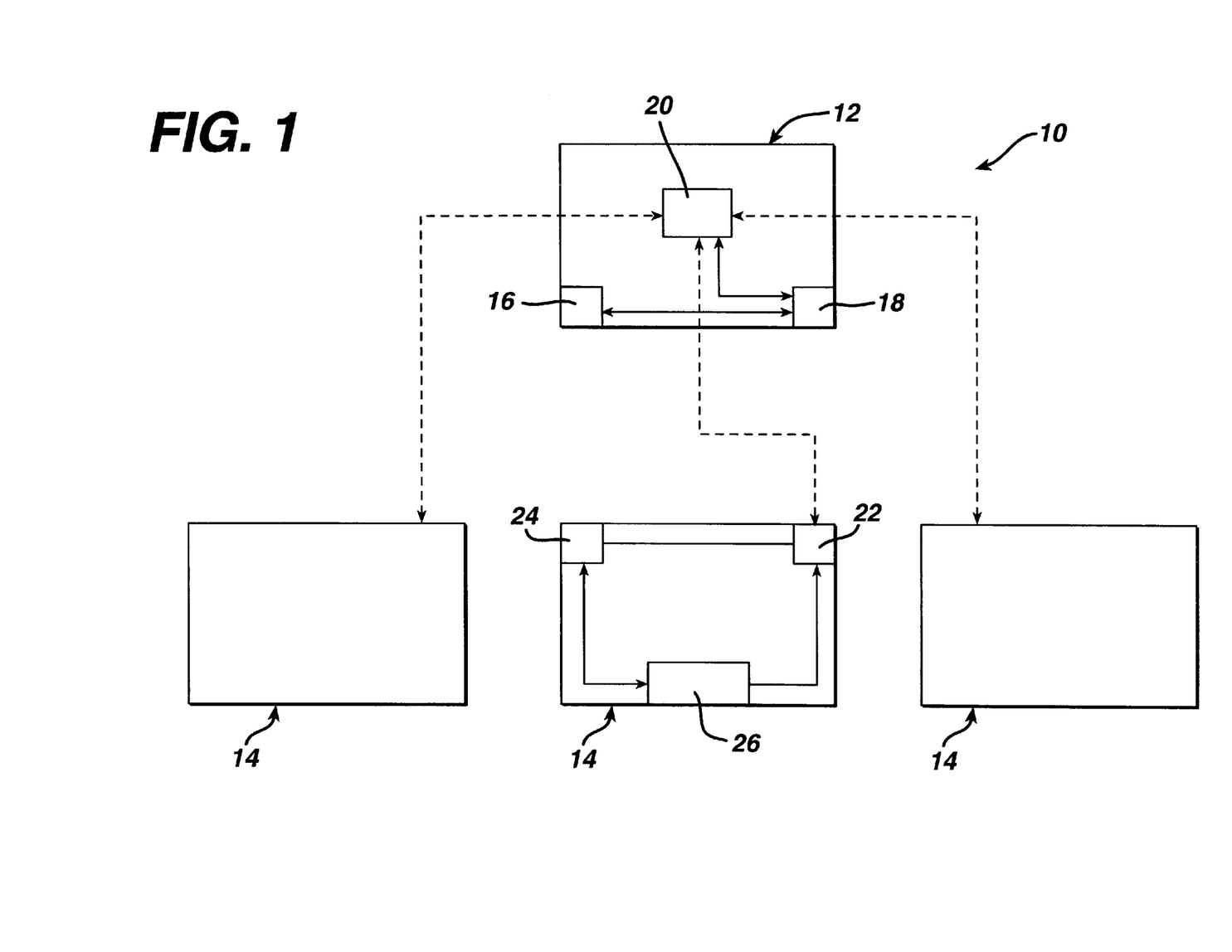
FIG. 1 is a schematic block diagram of the system disclosed by the present invention.

Referring now to the drawings in detail, wherein identical numerals indicate the same elements throughout the figures, FIG. 1 depicts schematically a system, generally represented by the numeral 10, for handling quality control data for a manufacturing process between a main computer 12 and a plurality of computers 14 located remotely from main computer 12. It will be understood that main computer 12 functions to analyze quality control data within a designated area of a manufacturing process by means of a statistical process control method. Remote computers 14 are utilized within system 10 to input quality control data into main computer 12 for analysis, as well as access the statistical analysis of such quality control data from main computer 12.

Contrary to typical networks of computers utilized for statistical process control purposes, main computer 12 and remote computers 14 are not necessarily connected at all times. Moreover, system 10 of the present invention is able to minimize cost and operating delays by having only main computer 12 responsible for performing the statistical analysis of quality control data which is input from all remote computers 14. This is particularly advantageous when the manufacturing process for a prototype is involved since the commitment of resources to system 10 is less than an entire network of computers connected at all times and each having the software for the statistical process control method operational thereon.

With respect to system 10, it will further be seen that main computer 12 includes memory 16 for storing a database of quality control data therein. A processor 18 in main computer 12 functions, among other things, to apply the statistical process control method to the quality control data and post the results of the statistical analysis on a web site (identified generally by the numeral 20 and discussed in greater detail hereinafter) run by main computer 12. Each remote computer 14 includes communications circuitry 22 for establishing a connection with web site 20 of main computer 12 by means of a web browser run by a processor 24. In addition, remote computers 14 include an interface 26 for inputting quality control data for a designated area of the manufacturing process into the web browser for receipt by main computer 12, as well as for receiving results of the statistical analysis of the quality control data from main computer web site 20 through the web browser.

Figure 2:
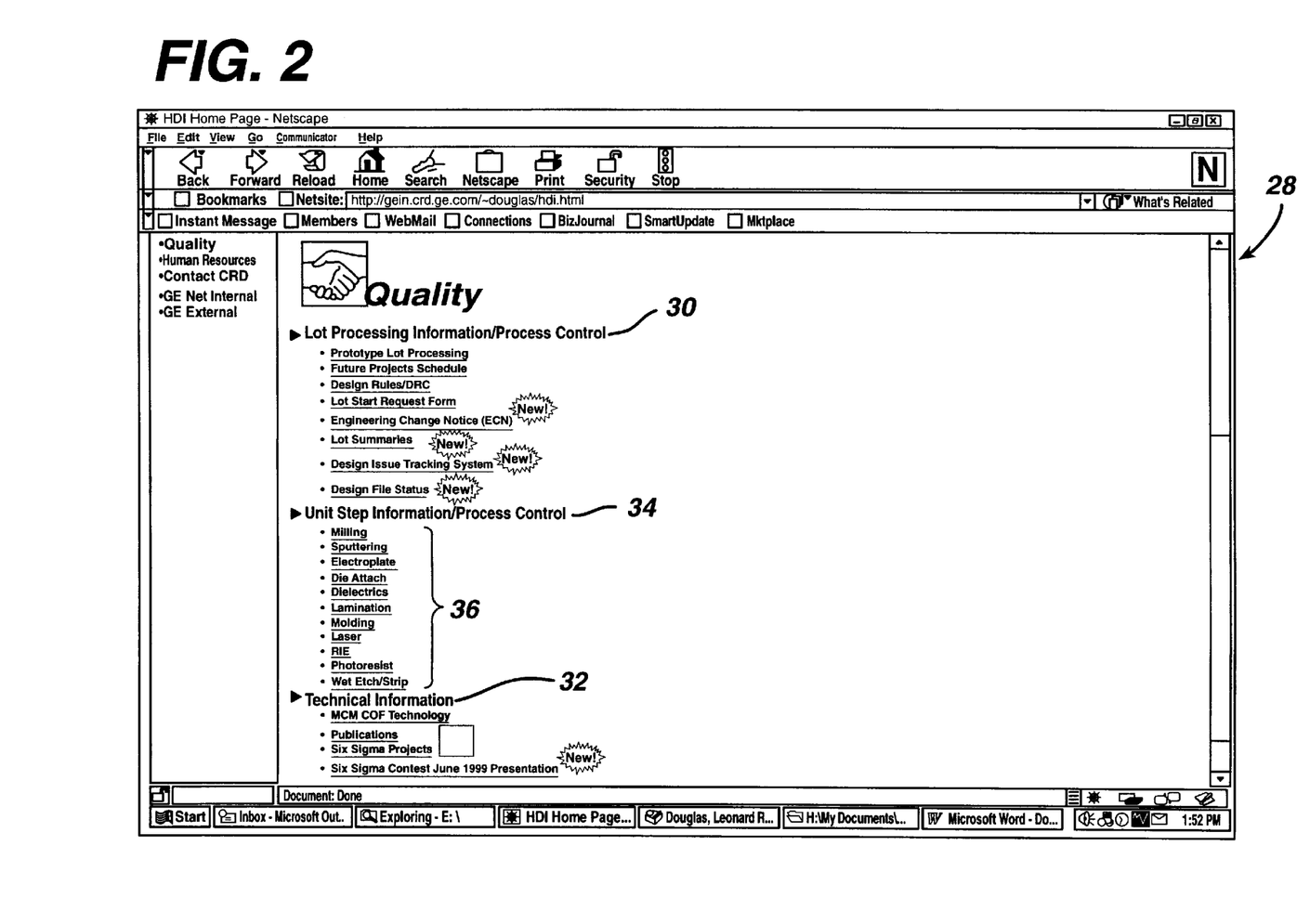
FIG. 2 is a screen display depicting an exemplary web page associated with a given netsite, where a plurality of areas relevant to a designated manufacturing process are shown.
Figure 3:
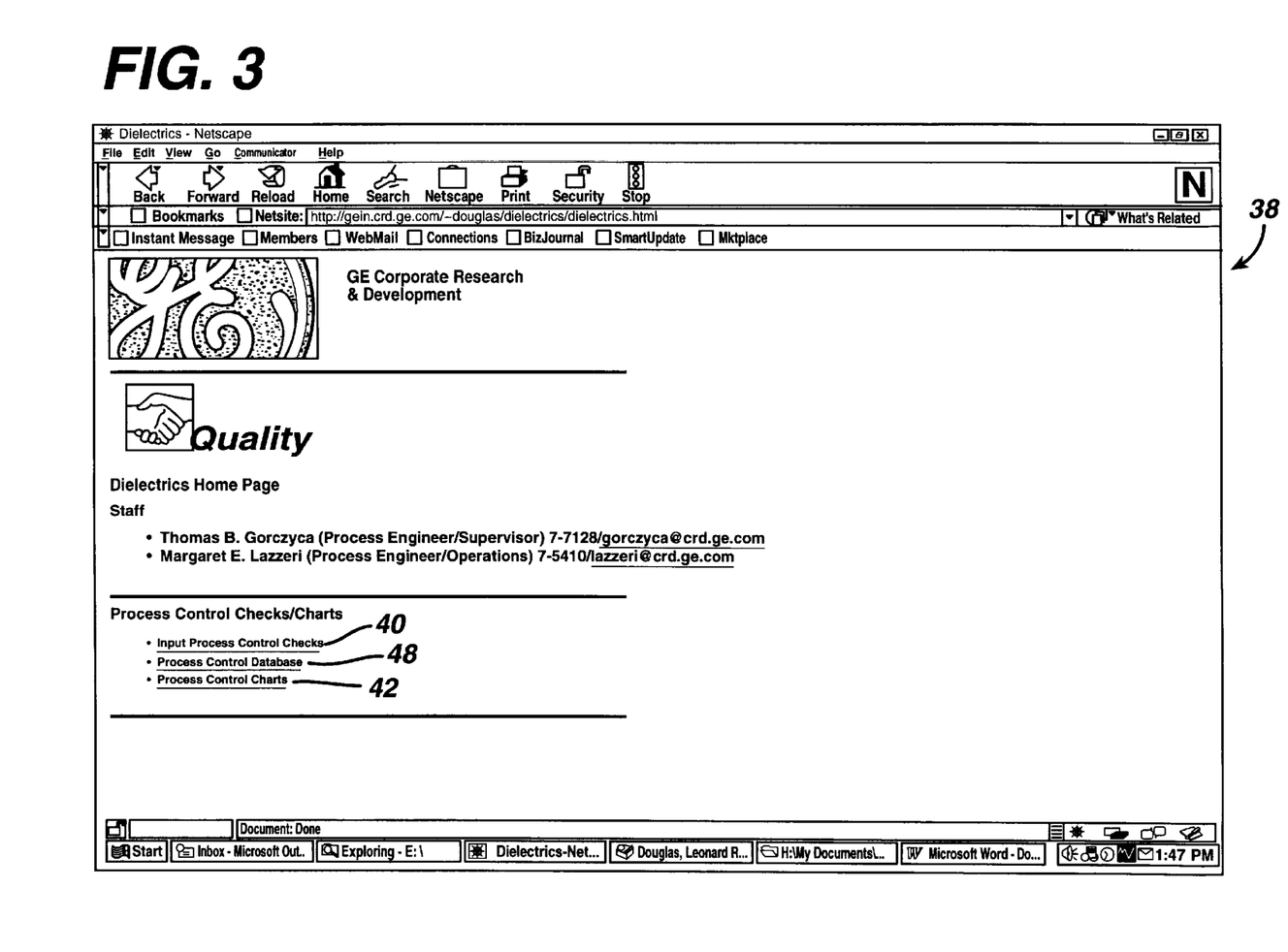
FIG. 3 is a home web page associated with a designated area of the manufacturing process shown in the web page of FIG. 2, from which quality control data can be input to or received from the main computer depicted in FIG. 1.

As seen in FIG. 2, main computer web site 20 typically includes a home page 28 depicting various information about a particular manufacturing process. Such categories of information may include, for example, certain information pertaining to lot processing or other technical matters as indicated at 30 and 32. In conjunction with the present invention, one category 34 of information preferably involves certain areas of the manufacturing process which has one or more parameters incorporated therein. It will be appreciated that each area of the manufacturing process has an identifier 36 associated therewith which is linked to a specific web home page 38 therefor. As a particular identifier 36 is clicked, specific web home page 38 appears, as depicted in FIG. 3 for the "Dielectrics" area.

It will be noted that while specific area web home page 38 may include other information, such as contact information, it primarily is utilized to access other web pages 44 and 46 (see FIGS. 4 and 5) linked to identifiers 40 and 42, which permit inputting of quality control data to main computer 12 and accessing of charts or other graphical displays depicting the statistical analysis of quality control data performed by main computer 12, respectively. Although not shown in a separate figure, specific area web home page 38 may also enable access to the raw quality control data in the database stored in main computer memory 16 through a linked identifier 48. In this way, remote computer 14 is able to download the quality control data in the database and perform its own statistical analysis as desired.

Figure 4:
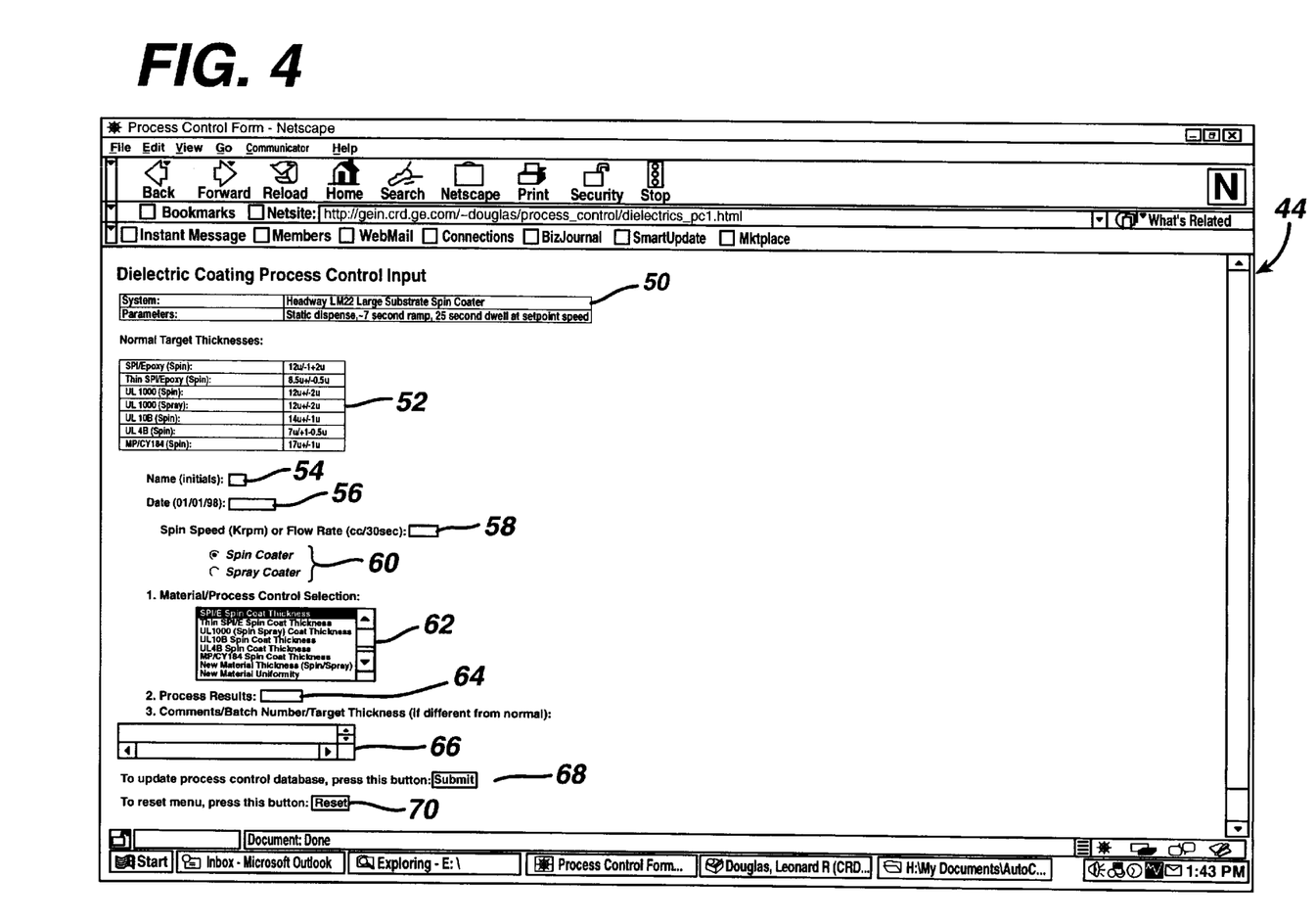
FIG. 4 is a web page associated with the inputting of quality control data to the main computer for certain parameters pertaining to the designated area of the manufacturing process as identified in FIG. 3.

It will be seen from FIG. 4 that web page 44 preferably includes one or more tables 50 and 52, respectively, to identify the parameters involved and a normal range therefor as relating to the manufacturing process. As further seen therein, one or more form based queries 54 and 56 are provided to identify basic information from the inputting source/remote computer (e.g., name and date), one or more form based queries 58 and 60 are provided to identify certain important factors or parameters related to the parameter designated, and one or more other form based queries 62, 64 and 66 are provided to identify any other significant factor pertaining to the designated parameter, results of the manufacturing process, and a comments section. It is also preferred that separate buttons 68 and 70 be provided on web page 44 to update the quality control database in main computer 12 and reset the menu of queries located thereon, respectively.

It will be understood that processor 18 of main computer 12 collects the quality control data transmitted from web page 44 through the web browser and then stores it in memory 16. In order to secure the accurate transmission of quality control data, it is preferred that such data be encoded by the web browser prior to collection by main computer 12 and decoded by the web browser prior to storage in main computer memory 16.

Figure 5:
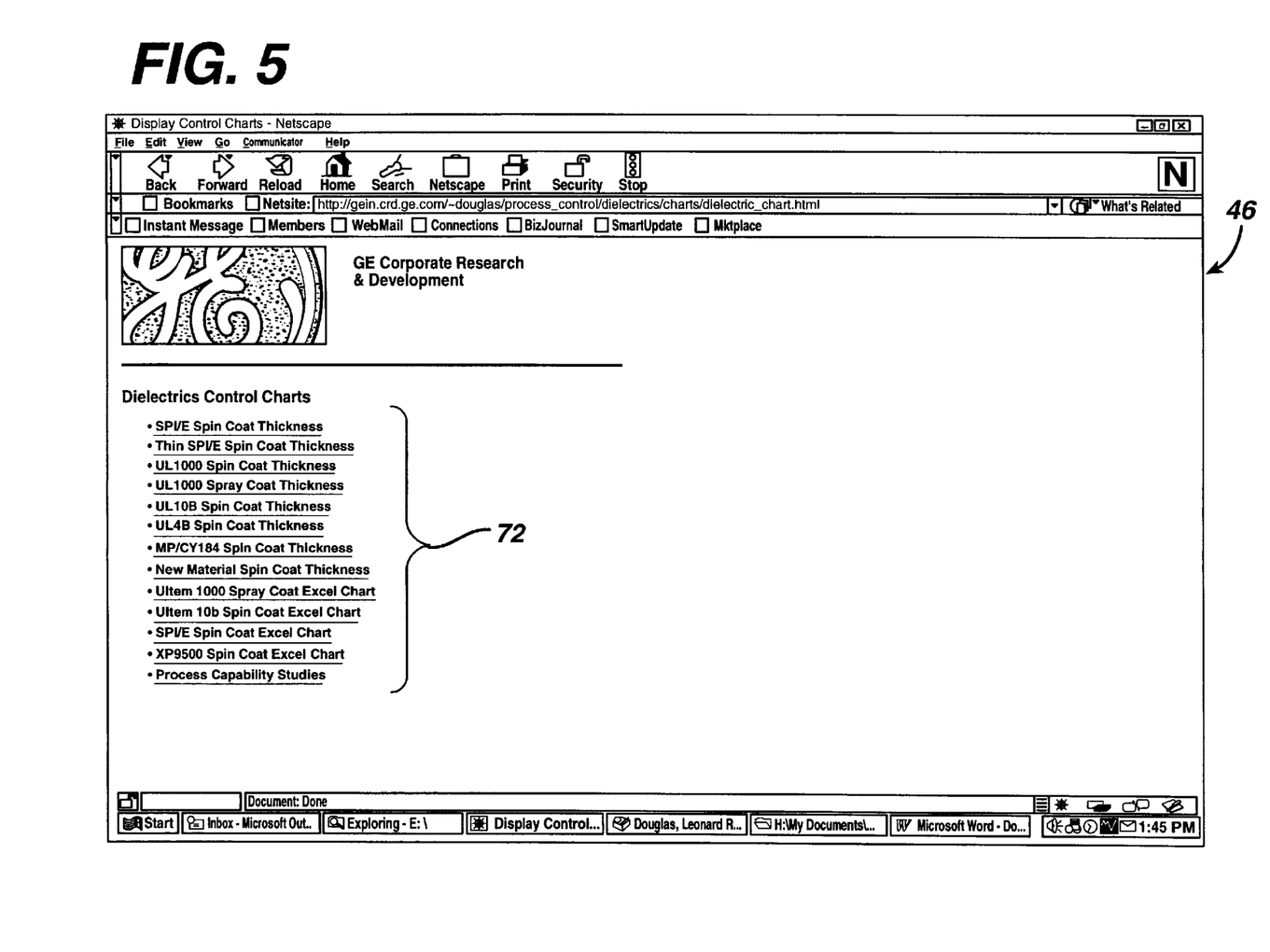
FIG. 5 is a web page associated with the receipt of graphical displays from the main computer for parameters related to the designated area of the manufacturing process as identified in FIG. 3.
Figure 6:
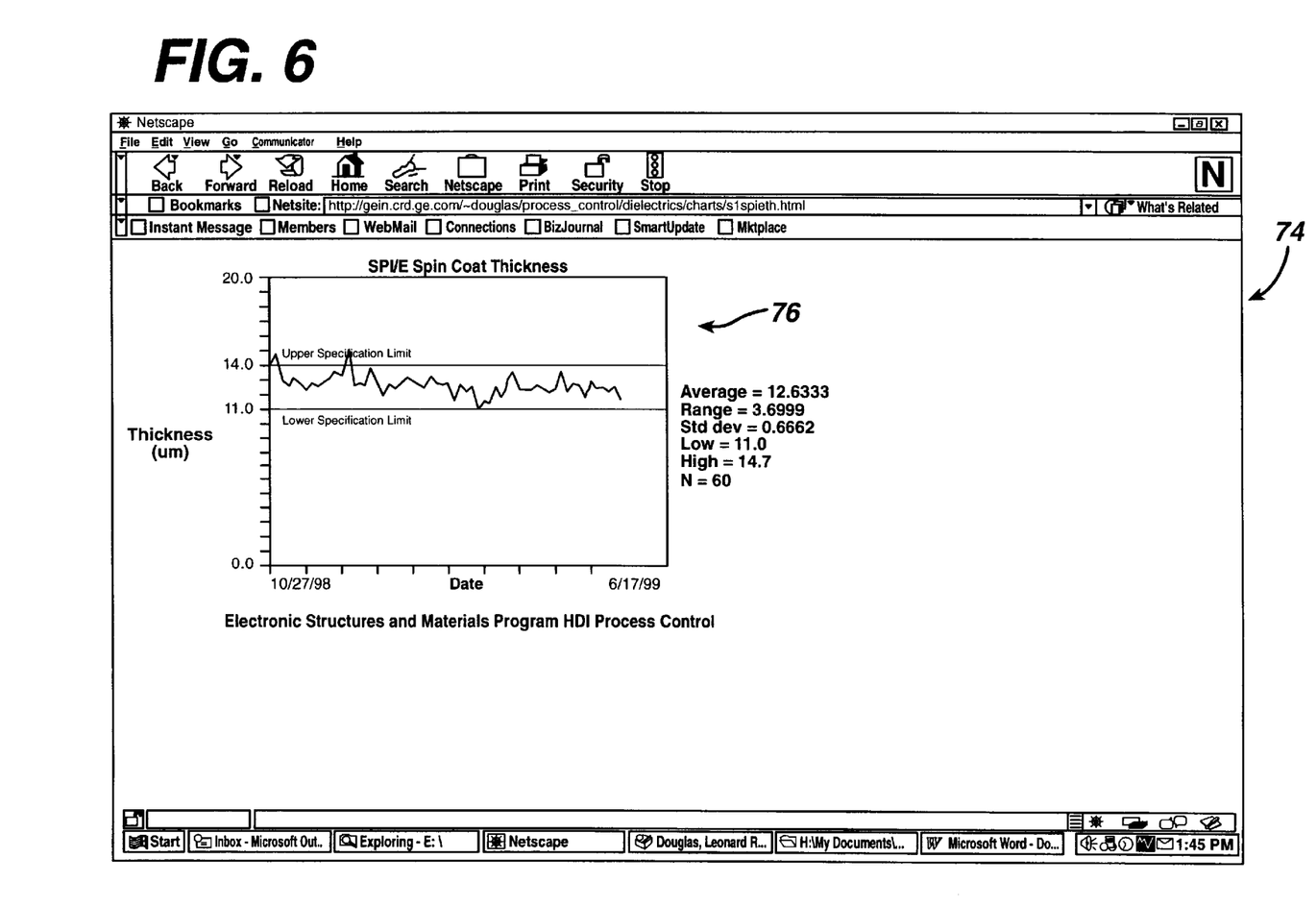
FIG. 6 is a web page depicting an exemplary graphical display for one of the parameters shown in FIG. 5; and, FIG. 7 is a flow diagram of the functional steps performed by the system depicted in FIG. 1 in accordance with the present invention.

FIG. 5 depicts web page 46 as including a plurality of identifiers 72 thereon linked with an associated control chart so that clicking on a particular identifier 72 causes a web page 74 containing such control chart 76 to appear (see FIG. 6). In this way, each remote computer 14 is able to access a graphical display of the pertinent quality control data through the web browser.

Because the handling of quality control data in system 10 occurs via the web browser, main computer 12 and remote computers 14 are connectable via an Intranet or the Internet. While an Intranet has inherent security built into it, use of the Internet preferably requires certain security measures to determine whether, for example, a remote computer 14 (or user thereof) is authorized to input quality control data into main computer memory 16 or even access the statistical analysis of such quality control data as described above. This can be accomplished by means of known security precautions, including, but not limited to, passwords or the like. Of course, such security measures should be taken immediately upon connection of remote computer 14 and main computer 12 before any other functions are permitted.

Figure 7:
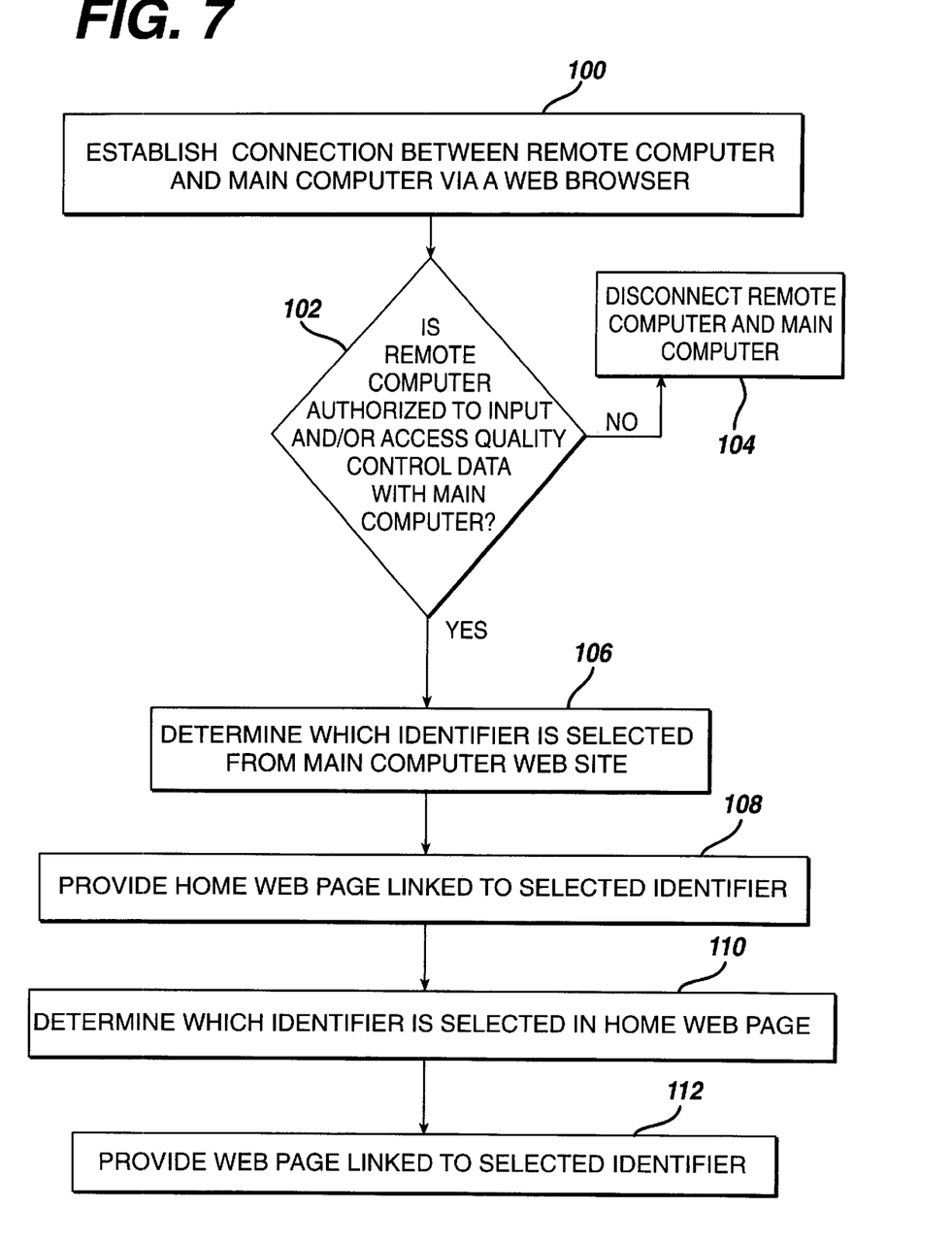

In order to better exhibit the steps of the process undertaken by system 10 for purposes of the present invention, the flow chart of FIG. 7 is provided herewith. As seen therein, remote computer 14 first establishes connection with main computer 12 over an Intranet or the Internet via a web browser (block 100). Thereafter, the web browser preferably queries remote computer 14 to determine whether it is authorized to input quality control data and/or access the statistical analysis performed for quality control data stored in main computer memory 16 (decision block 102). If the response to such query is negative, the web browser causes remote computer 14 to be disconnected (block 104). Otherwise, provided remote computer 14 is authorized to input or receive information from main computer web site 20, the web browser next determines which identifier 36 is selected (block 106) and provides a home web page 38 specific thereto (block 108).

Upon depiction of web page 38, the web browser next determines which identifier 40, 42 or 48 is selected (block 110) and provides an appropriate web page associated therewith (block 112). Afterward, remote computer 14 is able to input quality control data to the database of main computer 12, access raw quality control data from the database of main computer 12, or access control charts 76 reflecting the statistical analysis of the quality control data in the database of main computer 12.

Having shown and described the preferred embodiment of the present invention, further adaptations of the system and method for collecting, statistically analyzing, and graphically displaying process control data can be accomplished by appropriate modifications by one of ordinary skill in the art without departing from the scope of the invention. In particular, it will be noted that the particular statistical process control method (e.g., SPC or SPC charts) or web browser implemented is not critical the present invention.

What is claimed is:

1. A system for handling quality control data for a manufacturing process between a plurality of computers, comprising:

(a) a main computer for analyzing quality control data of a designated area of said manufacturing process by means of a statistical process control method, said main computer further comprising:
        (1) memory for storing a database of quality control data; and
        (2) a processor for applying said statistical process control method to said quality control data and posting the results of the statistical analysis on a web site;
    (b) at least one computer remotely located from said main computer, each remote computer comprising:
        (1) communications circuitry for establishing a connection with said main computer web site by means of a web browser; and
        (2) an interface for inputting quality control data for a designated area of said manufacturing process into said web browser for receipt by said main computer and receiving results of a statistical analysis of said quality control data from said main computer web site through said web browser.

2. The system of claim 1, wherein said main computer processor collects said quality control data from said web browser and stores said quality control data in said memory.

3. The system of claim 1, wherein said main computer processor links a graphical display of said statistical analysis results with an identifier on a web page of said main computer web site.

4. The system of claim 1, wherein said main computer and said remote computers are connectable via an Intranet.

5. The system of claim 1, wherein said main computer and said remote computers are connectable via the Internet.

6. The system of claim 1, wherein said quality control data is input into said web browser by completing a plurality of form based queries on a web page of said main computer web site linked to a designated area of said manufacturing process.

7. The system of claim 2, wherein said quality control data is encoded prior to collection of said quality control data from said web browser.

8. The system of claim 7, wherein said quality control data is decoded prior to storing said quality control data in said database.

9. The system of claim 1, said main computer processor further verifying the origin of said quality control data as a proper remote computer prior to storing said quality control data in said database.

10. A method of handling quality control data for a manufacturing process among a plurality of computers, comprising the following steps:

(a) establishing a connection between at least one remote computer and a main computer via a web browser;
    (b) inputting quality control data of said manufacturing process from said remote computer into a database of said main computer via said web browser;
    (c) performing a statistical analysis on said quality control data input into said main computer; and
    (d) posting results of said statistical analysis on a web site of said main computer accessible through said web browser.

11. The method of claim 10, said quality control data inputting step further comprising:

(a) collecting said quality control data from said web browser; and
    (b) storing said quality control data in said database of said main computer.

12. The method of claim 10, said posting step further comprising the step of linking a graphical display of said statistical analysis results with an identifier on said web site.

13. The method of claim 10, said performing step further comprising application of a statistical process control method to said quality control data.

14. The method of claim 10, wherein said remote computer and said main computer are connected via an Intranet.

15. The method of claim 10, wherein said remote computer and said main computer are connected via the Internet.

16. The method of claim 10, said quality control data inputting step further comprising the step of completing a plurality of form based queries on a web page of said main computer web site linked to a designated area of said manufacturing process.

17. The method of claim 11, said quality control data inputting step further comprising the step of encoding said quality control data prior to said collecting step.

18. The method of claim 17, said quality control data inputting step further comprising the step of decoding said quality control data prior to said storing step.

19. The method of claim 10, further comprising the step of verifying the origin of said quality control data as a proper remote computer prior to said inputting step.

* * * * *